(12) United States Patent
Srinivasan et al.

(10) Patent No.: US 7,440,420 B2
(45) Date of Patent: Oct. 21, 2008

(54) AUTOMATIC RESYNCHRONIZATION OF PHYSICALLY RELOCATED LINKS IN A MULTI-LINK FRAME RELAY SYSTEM

(75) Inventors: Sridevi Srinivasan, San Jose, CA (US); Praveen Athmanath, Santa Clara, CA (US); Naresh Sharma, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 820 days.

(21) Appl. No.: 10/778,761

(22) Filed: Feb. 12, 2004

(65) Prior Publication Data
US 2005/0180465 A1 Aug. 18, 2005

(51) Int. Cl.
*H04L 12/28* (2006.01)
(52) U.S. Cl. .......... 370/255; 370/225; 370/503
(58) Field of Classification Search ......... 370/225, 370/255, 503
See application file for complete search history.

(56) References Cited

U.S. PATENT DOCUMENTS

| | | | |
|---|---|---|---|
| 6,075,766 A | 6/2000 | Croslin | |
| 6,115,378 A | 9/2000 | Hendel et al. | |
| 6,539,017 B1 | 3/2003 | Davison | |
| 6,819,680 B2 * | 11/2004 | Hickman et al. | 370/475 |
| 2002/0114276 A1 * | 8/2002 | Basturk | 370/230 |
| 2005/0108376 A1 * | 5/2005 | Deval et al. | 709/223 |

OTHER PUBLICATIONS

"Multilink Frame Relay UNI/NNI Implementation Agreement", FRF. 16.1, Frame Relay Forum Technical Committee, May 2002.
International Search Report and Written Opinion of the International Searching Authority, including Notification of Transmittal, mailed Jun. 25, 2007, from International Application No. PCT/US05/02393, 11 pages.

* cited by examiner

*Primary Examiner*—Firmin Backer
*Assistant Examiner*—Jason Mattis
(74) *Attorney, Agent, or Firm*—Weaver Austin Villeneuve Sampson LLP

(57) ABSTRACT

Methods and apparatus are described which are operable to resynchronize bundle interfaces associated with network devices. Where all of a plurality of connections between previously synchronized first and second bundle interfaces have been physically relocated from the second bundle interface to a third bundle interface, synchronization of the first and third bundle interfaces is achieved without manual intervention.

26 Claims, 4 Drawing Sheets

AUTOMATIC RESYNCHRONIZATION OF PHYSICALLY RELOCATED LINKS IN A MULTI-LINK FRAME RELAY SYSTEM

BACKGROUND OF THE INVENTION

The present invention relates to frame relay networks protocols and, in particular, to systems which incorporate the functionalities described in the Frame Relay Forum Multi-Link Frame Relay UNI/NNI Implementation Agreement (FRF.16.1), the entire disclosure of which is incorporated herein by reference for all purposes. More specifically, the present invention provides techniques by which physically relocated serial links may be automatically resynchronized in the multi-link context.

Most networks are organized as a series of hardware and software levels or "layers" within each node. These layers interact to format data for transfer between, e.g., a source node and a destination node communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services.

FIG. 1 illustrates the relationship of subnetworks and gateways to layered protocols. Assume that the user application 102A in host A sends an application protocol data unit (PDU) to an application layer protocol 102B in host B such as, for example, a file transfer system. The file transfer software performs a variety of functions and sends file records to the user. In many systems, the operations at host B are known as server operations and the operations at host A are know as client operations.

As indicated by the downward arrows in the protocol stack at host A, this unit is passed to the transport layer protocol 104A, which performs a variety of operations and adds a header to the PDU passed to it. At this point, the unit of data is often referred to as a segment. The PDU from the upper layers is considered to be data to the transport layer.

Next, the transport layer passes the segment to the network layer 106A, also called the IP layer, which again performs specific services and appends a header. This unit (now called a datagram in internet terms) is passed down to the lower layers. Here, the data link layer adds its header as well as a trailer, and the data unit (now called a frame) is launched into subnetwork 110 by the physical layer 108A. Of course, if host B sends data to host A, the process is reversed and the direction of the arrows is changed.

Internet protocols are typically unaware of what goes on inside the network. The network manager is free to manipulate and manage the PDU in any manner necessary. In some instances, however, the internet PDU (data and headers) remains unchanged as it is transmitted through the subnet. In FIG. 1, it emerges at the gateway where it is processed through the lower layers 114 and passed to the IP (network) layer 112. Here, routing decisions are made based on the destination address provided by the host computer.

After these routing decisions have been made, the PDU is passed to the communications link connected to the appropriate subnetwork (comprising the lower layers). The PDU is re-encapsulated into the data link layer frame and passed to the next subnetwork 116, where it finally arrives at the destination host.

The destination (host B) receives the traffic through its lower layers and reverses the process that transpired at host A; it de-encapsulates the headers by stripping them off in the appropriate layer. The header is used by the layer to determine the actions it is to perform; the header therefore governs the layer's operations.

The PDU created by the file transfer application in the application service layer is passed to the file transfer application residing at host B. If host A and B are large mainframe computers, this application is likely an exact duplicate of the software at the transmitting host. The application might, however, perform a variety of functions, depending on the header it receives. It is conceivable that the data could be passed to another end-user application at host B, but in many instances the user at host A merely wants to obtain the services of a server protocol, such as a file transfer or email. If this is the case, it is not necessary for an end-user application process to be invoked at host B.

To return the retrieved data from the server at host B to the client at host A, the process is reversed. The data is transferred down through the layers in the host B machine, through the network, through the gateway, to the next network, and up the layers of host A to the end-user.

In Frame Relay networks, the operation of and the various services provided by the data link layer in the diagram of FIG. 1 are governed in accordance with the implementation agreements promulgated by the Frame Relay Forum (FRF). FRF. 16.1 (incorporated herein by reference above) describes techniques which enable multiple serial links to be aggregated into a single bundle of bandwidth, i.e., Multi-Link Frame Relay (MFR). More specifically, MFR enables the creation of a virtual interface called a bundle or bundle interface. The bundle interface emulates a physical interface for the transport of frames. The Frame Relay data link runs on the bundle interface, and Frame Relay virtual circuits are built upon it.

A bundle is made up of multiple serial links, called bundle links. Each bundle link within a bundle corresponds to a physical interface. Such a physical interface might correspond, for example, to a T1 or T3 interface. Bundle links are invisible to the Frame Relay data-link layer. As a result, Frame Relay functionality cannot be configured on these interfaces individually. Rather, the desired Frame Relay functionality must be configured on the bundle interface. Bundle links are visible to peer devices. The local router and peer devices exchange link integrity protocol control messages to determine which bundle links are operational and to synchronize which bundle links should be associated with which bundles.

For link management, each end of a bundle link follows the MFR Link Integrity Protocol and exchanges link control messages with its peer (the other end of the bundle link). To bring up a bundle link, both ends of the link must complete an exchange of ADD_LINK and ADD_LINK_ACK messages. To maintain the link, both ends periodically exchange HELLO and HELLO_ACK messages. This exchange of hello messages and acknowledgments serve as a "keep-alive" mechanism for the link. If a router is sending hello messages but not receiving acknowledgments, it will resend the hello message up to a configured maximum number of times. If the router exhausts the maximum number of retries, the link status is considered "DOWN" (unoperational).

Each link's status is considered "UP" (operational) when the corresponding link on the peer device acknowledges that it will use the same link for the bundle. The link's status remains "UP" when the corresponding link acknowledges the hello messages. The bundle interface's status becomes "UP" when at least one of its link has its status "UP." The bundle interface's status goes "DOWN" when the last bundle link is no longer in the "UP" state. This behavior complies with the class A bandwidth requirement defined in FRF.16.1.

Multi-Link Frame Relay provides load balancing across the bundle links within a bundle. If a bundle link chosen for transmission happens to be busy transmitting a long packet, the load balancing mechanism can try another link, thus solving the problems seen when delay-sensitive packets have to wait.

In addition, by combining multiple physical interfaces into a bundle, a Frame Relay interface may be designed with more bandwidth than is available from any single physical interface. For example, many new network applications require more bandwidth than is available on a T1 line. One option is to invest in a T3 line. However, T3 lines can be expensive and are not available in some locations. MFR provides a cost-effective solution to this problem by allowing multiple T1 lines to be aggregated into a single bundle of bandwidth.

Finally, MFR can provide greater service resilience when multiple physical interfaces are provisioned as a single bundle. That is, when a link fails the bundle continues to support the Frame Relay service by transmitting across the remaining bundle links.

One of the challenges associated with the MFR protocol is that it does not allow the physical relocation of bundle links from one bundle interface to another without manual intervention by the personnel of the service provider managing the intervening network, e.g., AT&T. An example referring to the block diagram of FIG. 2 will be illustrative of the disadvantages associated with such an approach.

In this example, bundle interface A of device 202 (including bundle links A1, A2, and A3) is logically connected with bundle interface B of device 204 (including bundle links B1, B2, and B3). When bundle links A1, A2, and A3 are physically connected to bundle links B1, B2, and B3, respectively, the MFR protocol begins exchanging control messages between the peer end points which contain the respective bundle and link identifications (BIDs and LIDs). For example, control messages sent from A1 to B1 contain the BID corresponding to A and the LID corresponding to A1. Similarly, control messages sent from B1 to A1 contain the BID corresponding to B and the LID corresponding to B1. Through the mutual exchange of these control messages, bundle interfaces A and B learn their peers, store the bundle and link identification information, and become operational.

If bundle links A1, A2, and A3 of bundle interface A are subsequently physically relocated to bundle links C1, C2, and C3 of bundle interface C (of device 206), the subsequent control messages between these links will indicate to the links of bundle interface A that the peer has changed from bundle interface B to bundle interface C. And because of the mismatch between the bundle IDs received on bundle links C1, C2 and C3 and the previously stored values, all of the links (and therefore the bundle interfaces) remain in the "DOWN" state. Thus, bundle interfaces A and C do not become operational.

Currently, the only way to effect such a physical relocation of links is by notifying the service provider managing the intervening network so that the necessary reconfiguration may be performed manually by the service provider's personnel. This involves the re-provisioning of the links. This typically requires the representative of the service provided to log onto a command line interface (CLI) and manually delete the bundle and link identification information associated with the previously learned peer interface(s), and then add the new links to begin synchronization with the new bundle. The disadvantages associated with this approach are manifest.

SUMMARY OF THE INVENTION

According to the present invention, methods and apparatus are provided which enable the automatic resynchronization of bundle interfaces associated with network devices. According to a specific embodiment, where all of a plurality of connections between previously synchronized first and second bundle interfaces have been physically relocated from the second bundle interface to a third bundle interface, synchronization of the first and third bundle interfaces is achieved without manual intervention.

According to a more specific embodiment, methods and apparatus are provided for resynchronizing bundle interfaces associated with network devices in a network. A first bundle interface associated with a first network device is synchronized with a second bundle interface associated with a second network device. The first bundle interface has a first plurality of links associated therewith. The second bundle interface has a second plurality of links associated therewith. A plurality of connections exist between the first and second pluralities of links. Where all of the connections between the first plurality of links and the second plurality of links have been physically relocated from the second plurality of links to a third plurality of links associated with a third bundle interface, bundle interface identification data stored during synchronization of the first and second bundle interfaces are automatically deleted. The first bundle interface is then synchronized with the third bundle interface.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments, the present invention provides techniques by which a network device in a Multi-Link Frame Relay network may automatically relearn a peer end to which the links have been physically relocated.

Figure 1:
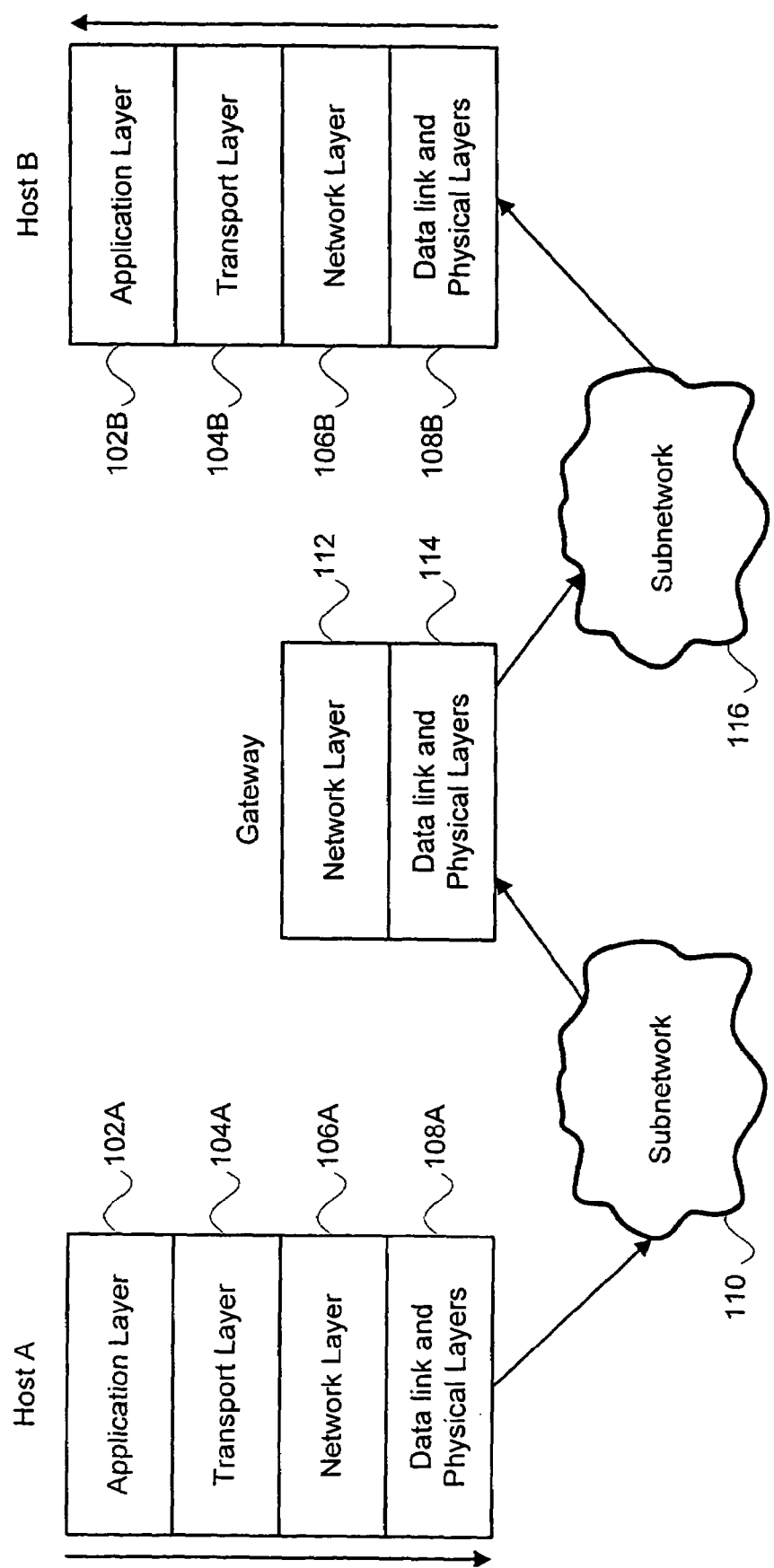
FIG. 1 is a block diagram illustrating the relationship of network devices to layered protocols.
Figure 2:
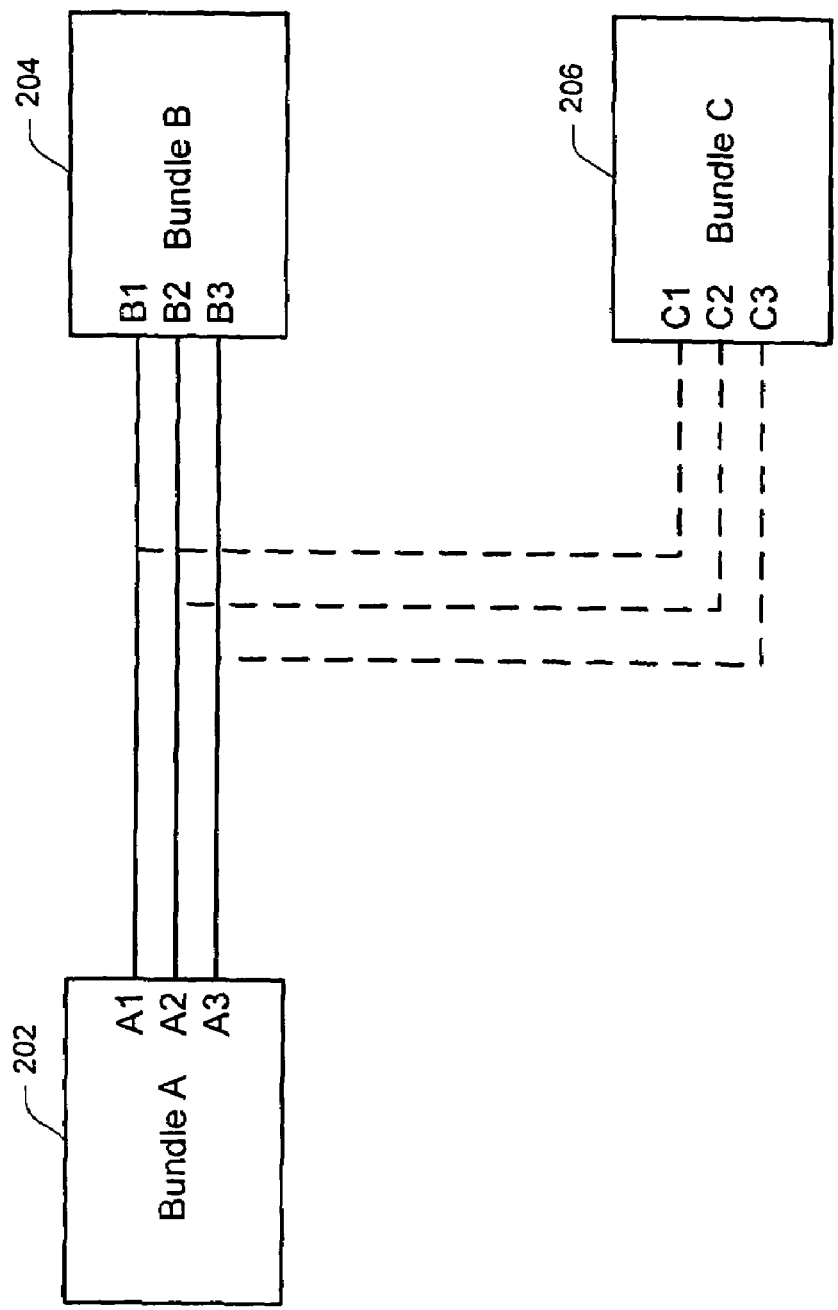
FIG. 2 is a simplified block diagram illustrating exemplary network devices in a Multi-Link Frame Relay network.
Figure 3:
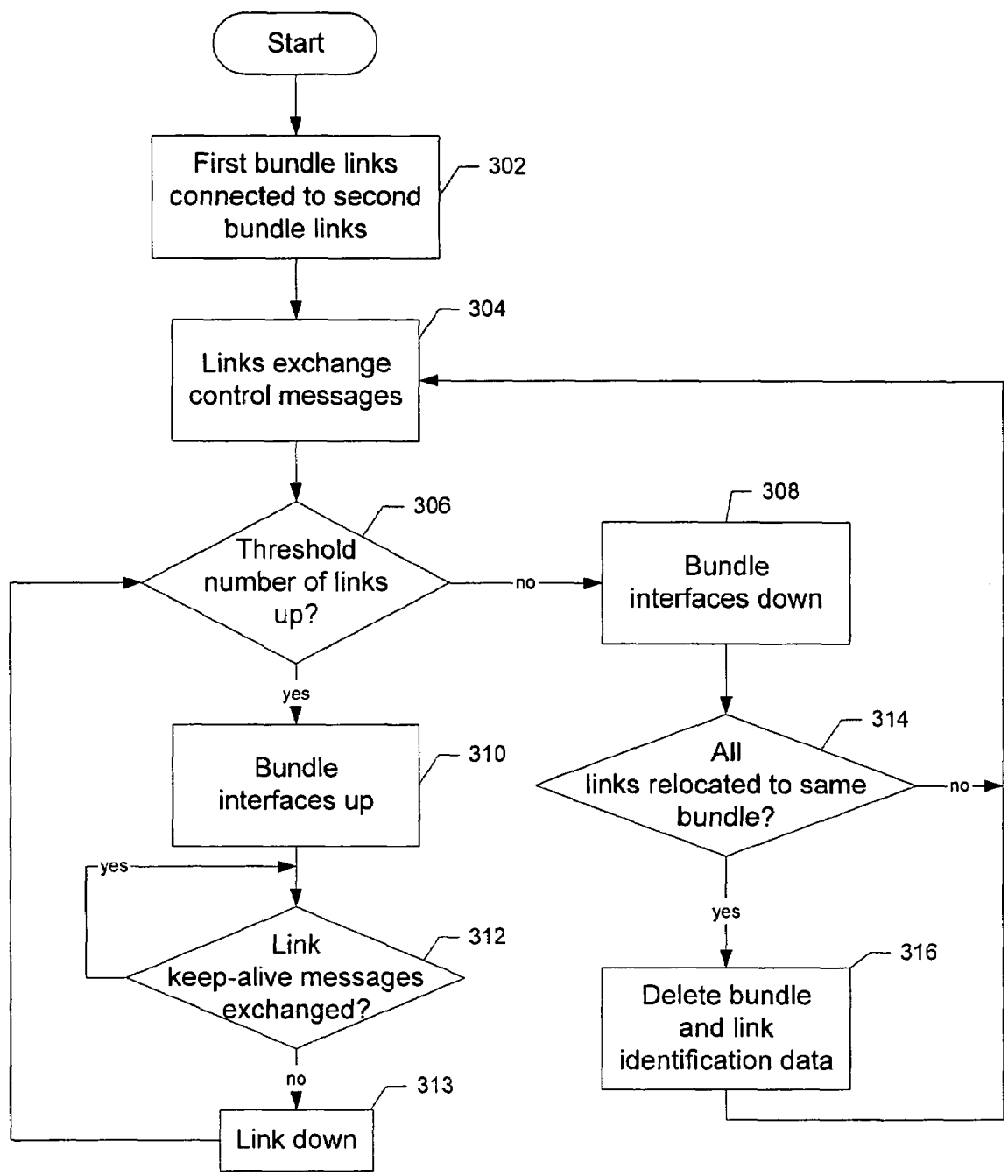
FIG. 3 is a flowchart illustrating a specific embodiment of the invention.

According to a specific embodiment, the automatic resynchronization of bundle interfaces is effected only where all of the links originally connected to one bundle interface have been physically relocated to another bundle interface. FIG. 3 is a flowchart illustrating such a specific embodiment of the invention and will be described with reference to the block diagram of FIG. 2.

As described above, bundle interface A of network device 202 is initially synchronized with bundle interface B of network device 204. That is, once serial links A1, A2, and A3 are physically connected to serial links B1, B2, and B3 (302), respectively, the links exchange ADD_LINK and ADD_LINK_ACK messages (304) which result in the storage of bundle interface and link identification data at each device. According to a specific embodiment, the bundle interface and link identification data at each device are in the bundle and link data structures (i.e., bundle and link database) of which there are RAM copies in the line card and persistent copies on the hard disk (which are used during line card reset conditions).

Once each link has learned and acknowledged the corresponding link of the peer device, its status is indicated to be "UP." Until the number of links which are "UP" reaches a threshold (306), the status of the corresponding bundle interface remains "DOWN" (308). According to various embodiments, the threshold number of links may be set to suit the particular application. According to a specific embodiment, the threshold is set to one so that even if only one link is "UP" the bundle will be "UP."

Once the number of operational links reaches the threshold (306), the status of bundle interfaces A and B are indicated to be "UP" (310). While the bundle interfaces are "UP," the individual links periodically exchange "keep-alive" messages, e.g., HELLO and HELLO_ACK messages, to maintain the links. If the keep-alive message is not received for one of the links (312), that link is placed in the "DOWN" state (313). It will be understood that this process of synchronizing and maintaining bundle interfaces may be implemented according to FRF.16.1 incorporated by reference above.

The operation of links in MFR networks is governed by a link state machine which is defined in FRF.16.1. According to a specific embodiment, a new link state is added to the link state machine to reflect the situation in which a link connection has been physically relocated to a link in another bundle. The state, referred to herein as "AUTO_SYNC," is to be distinguished from the normal link "UP" state.

According to a specific embodiment, a feature enable check is provided in the line card code which determines whether the automatic resynchronization features of the present invention is enabled. If enabled, the following takes place: When link A1 is moved from B1 to C1, A1 learns C1. When all the links of Bundle A (A1, A2 and A3) move to Bundle C, the Bundles A and C come up. This would not have been the case if the feature was disabled. Further details are provided below.

When a link is disconnected it will typically go into the "DOWN" state when the HELLO from one end is not acknowledged by the other. As described above, if a sufficient number of the links go down, the status of the bundle interface also goes down. When such a disconnected link is then reconnected to a link associated with a different bundle, the link will be placed in the "AUTO_SYNC" state when it tries to come up and the bundle interface identification data do not match the data stored from the earlier bundle interface synchronization. The "AUTO_SYNC" state is in addition to and is to be distinguished from the LINK_MISMATCH state.

Referring back to FIG. 3, if the status of a bundle interface is "DOWN" (308) and all of the links of the bundle interface (e.g., bundle interface B) have been physically relocated to the links associated with another bundle interface (e.g., bundle interface C)
(314), it is assumed that the relocation was intentional and the resynchronization of bundle interface A with bundle interface C begins. According to a specific embodiment, relocation of all the links to the same bundle is indicated by all of the links being in the "AUTO_SYNC" state described above.

The bundle and link identification data stored in network device 202 are then deleted (316), and the synchronization process between the links of bundle interface A (links A1, A2, and A3) and bundle interface C (C1, C2, and C3) is initiated (304). By contrast with previous implementations, this de-provisioning and subsequent new provisioning is done automatically without the need for manual intervention.

It should be noted that the resynchronization process does not commence unless all of the links have been relocated to links corresponding to a single bundle interface. That is, it is only assumed that the relocation of the links was intentional (and thus that resynchronization is appropriate) where all of the new links belong to the same bundle interface.

Generally, the techniques of the present invention may be implemented in software and/or hardware. For example, they can be implemented in an operating system kernel, in a separate user process, in a library package bound into network applications, on a specially constructed machine, or on a network interface card. In a specific embodiment of this invention, the techniques of the present invention are implemented on one or more Multi-Link Frame Relay interface cards. More specifically, according to some embodiments, the techniques of the present invention are implemented in the line card software.

A software or software/hardware hybrid implementation of the techniques of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay (including MFR) and ISDN interfaces, for example. Specific examples of such network devices include routers and switches available from Cisco Systems, Inc. of San Jose, Calif. A general architecture for some of these machines will appear from the description given below.

Figure 4:
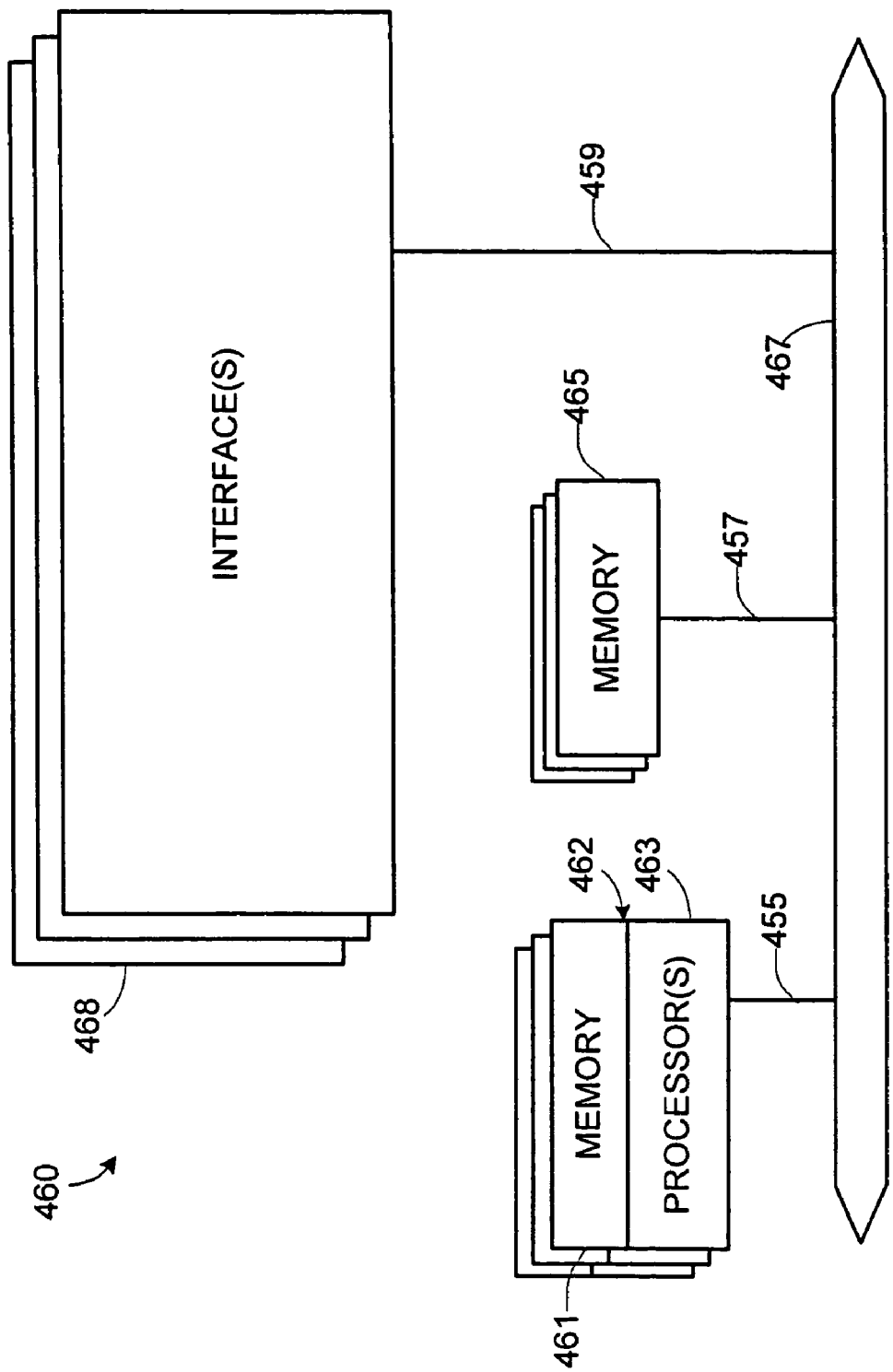
FIG. 4 is a simplified block diagram of a network device suitable for implementing specific embodiments of the invention.

Referring now to FIG. 4, a network device 460 suitable for implementing the techniques of the present invention includes a master central processing unit (CPU) 462, interfaces 468, and a bus 467 (e.g., a PCI bus). When acting under the control of appropriate software or firmware, CPU 462 may be responsible for implementing specific functions associated with the functions of a desired network device. For example, CPU 462 may be responsible for analyzing packets, encapsulating packets, forwarding packets to appropriate network devices, etc. CPU 462 preferably accomplishes all these functions under the control of software including an operating system and any appropriate applications software.

CPU 462 may include one or more processors 463 such as a processor from the Motorola family of microprocessors or the MIPS family of microprocessors. In an alternative embodiment, processor 463 is specially designed hardware for controlling the operations of network device 460. In a specific embodiment, a memory 461 (such as non-volatile RAM and/or ROM) also forms part of CPU 462. However, there are many different ways in which memory could be coupled to the system. Memory block 461 may be used for a variety of purposes such as, for example, caching and/or storing data, programming instructions, etc.

Interfaces 468 are typically provided as interface cards (sometimes referred to as "line cards"). Generally, they control the sending and receiving of data packets over the network and sometimes support other peripherals used with the network device 460. Among the interfaces that may be provided are Ethernet interfaces, frame relay (e.g., MFR) interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM and/or ROM. The independent processors may control such communications intensive tasks as packet switching, media control and management. Such processors may also be used to perform all or some of the tasks associated with the techniques of the present invention. By providing separate processors for the communications intensive tasks, these interfaces allow the master microprocessor 462 to efficiently perform routing computations, network diagnostics, security functions, etc.

Although the system shown in FIG. 4 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 465) configured to store data, program instructions for the general-purpose network operations and/or other information relating to the functionality of the techniques described herein. The program instructions may control the operation of an operating system and/or one or more applications, for example. Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for resynchronizing bundle interfaces associated with network devices in a network, comprising:

synchronizing a first bundle interface associated with a first network device with a second bundle interface associated with a second network device, the first bundle interface having a first plurality of links associated therewith, the second bundle interface having a second plurality of links associated therewith, a plurality of connections existing between the first and second pluralities of links;

determining whether all of the connections have been physically relocated from the second plurality of links to a third plurality of links, wherein determining whether all of the connections have been physically relocated from the second plurality of links to the third plurality of links comprises identifying when all of the first plurality of links correspond to a first state which corresponds to a mismatch between a stored bundle interface identifier and a received bundle interface identifier; and where all of the connections between the first plurality of links and the second plurality of links have been physically relocated from the second plurality of links to the third plurality of links associated with a third bundle interface, automatically deleting bundle interface identification data stored during synchronization of the first and second bundle interfaces; and synchronizing the first bundle interface with the third bundle interface, wherein operation of each of the first, second, and third pluralities of links is governed by a link state machine, the link state machine including a first state which corresponds to a mismatch between a stored bundle interface identifier and a received bundle interface.

2. The method of claim 1 wherein the network comprises a Multi-Link Frame Relay network.

3. The method of claim 1, wherein automatic deletion of the bundle interface identification data occurs only where all of the first plurality of links are in the first state.

4. The method of claim 1 wherein synchronizing the first bundle interface with the second bundle interface comprises:

exchanging control messages between the first plurality of links and the second plurality of links via the connections; and bringing up the first and second bundle interfaces when a threshold number of the first and second pluralities of links come up.

5. The method of claim 4 wherein the threshold number is programmable.

6. The method of claim 4 wherein the threshold number is either of one or two.

7. The method of claim 1 wherein automatically deleting the bundle interface identification data comprises deleting the bundle interface identification data from one or more memories on line cards associated with the first plurality of links.

8. The method of claim 1 wherein the third bundle interface corresponds to a third network device separate from the second network device.

9. The method of claim 1 wherein the third bundle interface corresponds to the second network device.

10. The method of claim 1 wherein synchronizing the first bundle interface with the third bundle interface comprises:
exchanging control messages between the first plurality of links and the third plurality of links via the connections; and
bringing up the first and third bundle interfaces when a threshold number of the first and third pluralities of links come up.

11. A network device, comprising:
a first bundle interface which includes a first plurality of links; and
a processor which is operable to:
synchronize the first bundle interface with a second bundle interface associated with a second network device, the second bundle interface having a second plurality of links associated therewith, a plurality of connections existing between the first and second pluralities of links;
automatically delete bundle interface identification data stored during synchronization of the first and second bundle interfaces where all of the connections between the first plurality of links and the second plurality of links have been physically relocated from the second plurality of links to a third plurality of links associated with a third bundle interface;
determine whether all of the connections have been physically relocated from the second plurality of links to the third plurality of links, wherein determining whether all of the connections have been physically relocated from the second plurality of links to the third plurality of links comprises identifying when all of the first plurality of links correspond to a first state which corresponds to a mismatch between a stored bundle interface identifier and a received bundle interface identifier; and
synchronize the first bundle interface with the third bundle interface, wherein operation of each of the first plurality of links is governed by a link state machine, the link state machine including a first state which corresponds to a mismatch between a stored bundle interface identifier and a received bundle interface identifier.

12. The network device of claim 11 further comprising a line card for each of the first plurality of links, the processor being disposed on the line card.

13. The network device of claim 12 wherein the line card is a Multi-Link Frame Relay (MFR) line card.

14. The network device of claim 11, wherein automatic deletion of the bundle interface identification data occurs only where all of the first plurality of links are in the first state.

15. The network device of claim 11 wherein the processor is operable to synchronize the first bundle interface with the second bundle interface by:
exchanging control messages between the first plurality of links and the second plurality of links via the connections; and
bringing up the first and second bundle interfaces when a threshold number of the first and second pluralities of links come up.

16. The network device of claim 15 wherein the threshold number is programmable.

17. The network device of claim 15 wherein the threshold number is either of one or two.

18. The network device of claim 11 wherein the processor is operable to automatically delete the bundle interface identification data by deleting the bundle interface identification data from one or more memories on line cards associated with the first plurality of links.

19. The network device of claim 11 wherein the third bundle interface corresponds to a third network device separate from the second network device.

20. The network device of claim 11 wherein the third bundle interface corresponds to the second network device.

21. The network device of claim 11 wherein the processor is operable to synchronize the first bundle interface with the third bundle interface by:
exchanging control messages between the first plurality of links and the third plurality of links via the connections; and
bringing up the first and third bundle interfaces when a threshold number of the first and third pluralities of links come up.

22. The network device of claim 11 wherein the processor is further operable to determine whether all of the connections have been physically relocated from the second plurality of links to the third plurality of links.

23. The network device of claim 22 wherein the processor is operable to determine whether all of the connections have been physically relocated from the second plurality of links to the third plurality of links by identifying when all of the first plurality of links correspond to a first state which corresponds to a mismatch between a stored bundle interface identifier and a received bundle interface identifier.

24. A computer program product for resynchronizing bundle interfaces associated with network devices in a network, the computer program product comprising at least one computer readable medium having computer program instructions stored therein which are operable to:
synchronize a first bundle interface associated with a first network device with a second bundle interface associated with a second network device, the first bundle interface having a first plurality of links associated therewith, the second bundle interface having a second plurality of links associated therewith, a plurality of connections existing between the first and second pluralities of links;
determine whether all of the connections have been physically relocated from the second plurality of links to a third plurality of links, wherein determining whether all of the connections have been physically relocated from the second plurality of links to the third plurality of links comprises identifying when all of the first plurality of links correspond to a first state which corresponds to a mismatch between a stored bundle interface identifier and a received bundle interface identifier;
where all of the connections between the first plurality of links and the second plurality of links have been physically relocated from the second plurality of links to the third plurality of links associated with a third bundle interface, automatically delete bundle interface identification data stored during synchronization of the first and second bundle interfaces; and
synchronize the first bundle interface with the third bundle interface, wherein operation of each of the first, second, and third pluralities of links is governed by a link state machine, the link state machine including a first state which corresponds to a mismatch between a stored bundle interface identifier and a received bundle interface identifier.

25. An apparatus, comprising:
means for synchronizing a first bundle interface associated with a first network device with a second bundle interface associated with a second network device, the first bundle interface having a first plurality of links associated therewith, the second bundle interface having a second plurality of links associated therewith, a plurality of connections existing between the first and second pluralities of links;

means for automatically deleting bundle interface identification data stored during synchronization of the first and second bundle interfaces where all of the connections between the first plurality of links and the second plurality of links have been physically relocated from the second plurality of links to a third plurality of links associated with a third bundle interface;

means for determining whether all of the connections have been physically relocated from the second plurality of links to the third plurality of links, wherein determining whether all of the connections have been physically relocated from the second plurality of links to the third plurality of links comprises identifying when all of the first plurality of links correspond to a first state which corresponds to a mismatch between a stored bundle interface identifier and a received bundle interface identifier; and means for synchronizing the first bundle interface with the third bundle interface, wherein operation of each of the first, second, and third pluralities of links is governed by a link state machine, the link state machine including a first state which corresponds to a mismatch between a stored bundle interface identifier and a received bundle interface identifier, and wherein automatic deletion of the bundle interface identification data occurs when all of the first plurality of links are in the first state.

26. A computer-implemented method for resynchronizing bundle interfaces associated with network devices comprising, where all of a plurality of connections between previously synchronized first and second bundle interfaces have been physically relocated from the second bundle interface to a third bundle interface, synchronizing the first and third bundle interfaces without manual intervention, wherein operation of each of the first, second, and third bundle of interfaces is governed by a link state machine, the link state machine including a first state which corresponds to a mismatch between a stored bundle interface identifier and a received bundle interface identifier, and wherein automatic deletion of the bundle interface identification data occurs when all of a first plurality of links associated with the first bundle interface are in the first state.

* * * * *